US012424968B2

(12) United States Patent
Hashimoto et al.

(10) Patent No.: US 12,424,968 B2
(45) Date of Patent: Sep. 23, 2025

(54) SOLAR POWER GENERATION PANEL STRUCTURE AND REINFORCING PLATE FOR SOLAR POWER GENERATION PANEL STRUCTURE

(71) Applicant: TOYOTA JIDOSHA KABUSHIKI KAISHA, Toyota (JP)

(72) Inventors: Hiroyuki Hashimoto, Gotemba (JP); Kiyoto Sasaki, Shizuoka-ken (JP); Shoichi Iwamoto, Fuji (JP); Kosuke Suzuki, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 18/390,558

(22) Filed: Dec. 20, 2023

(65) Prior Publication Data
US 2024/0297610 A1    Sep. 5, 2024

(30) Foreign Application Priority Data

Mar. 4, 2023   (JP) .................................. 2023-033269

(51) Int. Cl.
*H02S 20/23*    (2014.01)

(52) U.S. Cl.
CPC .................................... *H02S 20/23* (2014.12)

(58) Field of Classification Search
None
See application file for complete search history.

(56) References Cited

FOREIGN PATENT DOCUMENTS

| FR | 3018406 A1 | * | 9/2015 | ............. H02S 20/23 |
|----|------------|---|--------|------------------------|
| JP | 2019-143306 A | | 8/2019 | |
| JP | 2020-165233 A | | 10/2020 | |
| JP | 2021-090251 A | | 6/2021 | |
| JP | 2022-082923 A | | 6/2022 | |

OTHER PUBLICATIONS

English language machine translation of FR-3018406-A1. (Year: 2025).*

* cited by examiner

*Primary Examiner* — Eli S Mekhlin
(74) *Attorney, Agent, or Firm* — SoraIP, Inc.

(57) ABSTRACT

A structure in which a reinforcing plate is laminated and fixed to a solar power generation panel in which a plurality of solar cells are arranged vertically or horizontally on a panel member, the reinforcing plate extends along the surface It has a plurality of cut-and-raised beads, and the extending direction of the cut-and-raised beads is curved.

14 Claims, 4 Drawing Sheets

SOLAR POWER GENERATION PANEL STRUCTURE AND REINFORCING PLATE FOR SOLAR POWER GENERATION PANEL STRUCTURE

CROSS-REFERENCE TO RELATED APPLICATION

This application claims priority to Japanese Patent Application No. 2023-033269 filed on Mar. 4, 2023 incorporated herein by reference in its entirety.

BACKGROUND

1. Technical Field

The present disclosure relates to a solar power generation panel in which a solar cell module in which solar cells are arranged is provided on a plate-shaped panel member, and more specifically, a solar power generation panel structure including the solar power generation panel provided with a reinforcing plate for improving the impact resistance or the load resistance of the solar power generation panel.

2. Description of Related Art

With the spread of solar power generation, the solar power generation panel has come to be arranged in various places such as on the roofs of buildings and moving bodies (buildings, etc.) that are irradiated with sunlight. Since the solar power generation panels are usually installed outdoors, various configurations have been proposed in which the solar power generation panels are installed in consideration of the resistance against external forces that may be received during installation. For example, Japanese Unexamined Patent Application Publication No. 2022-82923 (JP 2022-82923 A) discloses a configuration in which a solar cell panel that is lightweight and has improved impact resistance is placed on a beam placed on a roof. Japanese Unexamined Patent Application Publication No. 2019-143306 (JP 2019-143306 A) discloses a configuration in which, in order for a solar cell module to have a load resistance suitable for the situation of the installation site, the solar cell module is configured to be provided with a holding frame that has a long shape parallel to an outer edge of a solar cell panel, that includes a side surface portion erected on the side of the outer edge, and that holds the outer edge of the solar cell panel, and a reinforcing part that reinforces the holding frame by being detachably fitted to the holding frame on the side of the solar cell panel rather than the side surface portion, and a beam-shaped support rack disposed on a bottom side of the solar cell module and disposed on the roof is engaged with the holding frame via the reinforcing part by a fixing bracket. Japanese Unexamined Patent Application Publication No. 2021-90251 (JP 2021-90251 A) discloses a configuration of a solar cell module in which, a vertical bar that is a support body that supports a solar cell panel and a frame that holds an outer edge of the solar cell panel is placed on a roof, a fixing bracket that is a fixing part that fixes the frame to the vertical bar is able to slide along a rail groove provided on the frame while being fitted in the rail groove, when the fixing bracket is removed from the vertical bar, and the frame can be easily fixed to the support body regardless of its height. Further, in Japanese Unexamined Patent Application Publication No. 2020-165233 (JP 2020-165233 A), a configuration is disclosed in which, when installing a solar cell module on a roof of a building in which an autoclaved lightweight aerated concrete (ALC) panel is used as a roof material, a prop is erected on a beam that supports the ALC panel, and a bar to which the solar cell module is fixed, is disposed on the prop.

SUMMARY

The roof of a building or the like on which the solar power generation panel as described above is installed has a limit of weigh to be loaded depending on the type of the roof. Therefore, the weight of the solar power generation panel and a structure for installing the solar power generation panel (solar power generation panel structure) is desirably as light as possible. On the other hand, the solar power generation panel installed outdoors desirably has sufficient resistance (impact resistance or load resistance) against local impact loads caused by falling objects due to hail or distributed loads caused by wind and snow. Therefore, as a method for improving such impact resistance or load resistance, a configuration is used in which a plate-shaped member (reinforcing plate) having surface rigidity is laminated or attached to the solar power generation panel to reinforce the solar power generation panel. In this case, when the thickness of the reinforcing plate is simply increased in order to increase the surface rigidity of the reinforcing plate, the weight of the solar power generation panel structure will increase. Therefore, in order to be able to install the solar power generation panels on roofs of as many kinds of buildings as possible, it is advantageous to be able to improve the surface rigidity of the solar power generation panel structure or the reinforcing plate without increasing the weight of the solar power generation panel structure.

By the way, in general, the relationship between load p applied to any position of the plate-shaped member such as the solar power generation panel structure and deflection amount w of the plate-shaped member due to the load is expressed as the following formula, according to the bending theory of a flat plate.

$$p = D \cdot \nabla^4 w \qquad (1)$$

Here, $\nabla^4$ is $\partial 4/\partial x\,4 + 2\partial 4/\partial x 2\partial y 2 + \partial 4/\partial y 4$, and D is the flexural rigidity of the plate-shaped member. Here, flexural rigidity D is expressed as the following formula using longitudinal elastic modulus E, Poisson's ratio v, and plate thickness t.

$$D = E \cdot t^3 / \{12(1 - v^2)\} \qquad (2a)$$

Alternatively, flexural rigidity D is expressed as the following formula using shear modulus G, Poisson's ratio v, and plate thickness t.

$$D = G \cdot t^3 / \{6(1 - v)\} \qquad (2b)$$

Therefore, when Poisson's ratio v can be reduced, it is possible to increase D (even though plate thickness t is increased, D is increased, but the weight of the plate-shaped member is increased). Then, the greater flexural rigidity D, the smaller the deflection against load p (the greater D is, the energy due to load p becomes stored elastic energy, and the deflection of the panel-shaped member is reduced), and the surface rigidity of the plate-shaped member is increased, and breakage of the plate-shaped member is less likely to occur. That is, when the solar power generation panel is reinforced with the reinforcing plate, and a member with Poisson's ratio v reduced is adopted as the reinforcing plate without increasing plate thickness t, the impact resistance or the load resistance of the solar power generation panel can be improved by suppressing the increase in the weight of the solar power generation panel structure as much as possible. This knowledge is utilized in the present disclosure.

Thus, the main issue of the present disclosure is to increase the surface rigidity of the solar power generation panel structure or the reinforcing plate, and improve the impact resistance or the load resistance of the solar power generation panel without increasing the weight of the solar power generation panel structure as much as possible.

According to the present disclosure, the above issue is achieved by a solar power generation panel structure in which a reinforcing plate is laminated and fixed to a solar power generation panel. The reinforcing plate includes a plurality of cut-and-raised beads extending along a surface of the reinforcing plate; and an extending direction of the cut-and-raised bead is curved.

In the above description, the "solar power generation panel" may be, as already mentioned, a panel on which a solar cell module in which a plurality of solar cells is arranged on a plate-shaped panel member in a longitudinal direction or a lateral direction is placed. Each of the solar cells may have a generally rectangular plate shape, and the shape of the solar power generation panel may be a generally rectangular plate shape, but is not limited to this. The "reinforcing plate" may be a thin plate made of any metal material or resin material, etc., and may be laminated to the back surface of the panel member of the solar power generation panel (surface opposite to the surface on which the solar cells are attached), and may be fixed by screwing or by adhesion using an adhesive. A "cut-and-raised bead" refers to a bead (protrusion) formed by bending the edge of a punched hole or a through hole extending linearly on the surface of the reinforcing plate in a direction perpendicular to the surface of the reinforcing plate.

In particular, in the structure according to the present disclosure, the reinforcing plate is provided with a plurality of the cut-and-raised beads, and each of the cut-and-raised beads is formed to be curved in its extending direction, that is, the tangential direction of the bead is gradually changed. According to this configuration, first, since the cut-and-raised bead that is a hole penetrating the reinforcing plate is provided, the rigidity against the bending of the structure is applied to the load component acting in the direction perpendicular to the surface of the solar power generation panel (vertical load component) due to the presence of the bead projecting from the surface of the reinforcing plate. In addition to this, the hole portion opening in the bead absorbs the distortion in the surface direction of the reinforcing plate, the (appearance) Poisson's ratio of the structure is reduced, and as understood from the above formula (2a) or formula (2b), the flexural rigidity is increased, so that the deflection against the vertical load component in the solar power generation panel is reduced. In addition, in the case of the cut-and-raised bead, the reinforcing plate is hollowed out. Therefore, when the bead extends in a certain direction, a vulnerable portion against twisting around the extending direction, that is, the bead in the present disclosure, is curved to be gradually changed in its extending direction, so that the vulnerability against the twisting in a specific direction is avoided. Thus, in the configuration of the present disclosure, since the reinforcing plate on which the cut-and-raised bead with its extending direction curved is provided is backed on the solar power generation panel, the impact resistance or the load resistance of the solar power generation panel is improved without increasing the thickness of the reinforcing plate, that is, the weight. In order to obtain the above effects, the cut-and-raised bead may be formed on the reinforcing plate so as to draw any curve such as an arc, a parabola, and a hyperbola.

More specifically, in the above-described structure according to the present disclosure, the cut-and-raised beads may be arranged on the reinforcing plate so as to extend generally along a circle or an ellipse. According to such a configuration, the Poisson's ratio is substantially evenly reduced in a region where the cut-and-raised beads are arranged, and the directions of being vulnerable against the twisting are evenly distributed. This avoids localized vulnerability against the twisting in one of the directions, so that in the region where the cut-and-raised beads are located, the rigidity of the surface is evenly increased in generally all the directions in the surface of the solar power generation panel, and the impact resistance or the load resistance is improved. In this regard, as shown in the figures described below, the cut-and-raised beads may be arranged such that a plurality of the circles or the ellipses drawn by the cut-and-raised beads are arranged over the entire area of the reinforcing plate, and the circles or the ellipses drawn by the cut-and-raised beads intersect with each other.

In addition, the curved cut-and-raised bead may be formed so as to extend between portions corresponding to any two diagonal corners of each of the solar cells arranged side by side on the solar power generation panel. The region where the curved cut-and-raised bead extends is a region where the flexural rigidity is improved, and the impact resistance or the load resistance in the region where each solar cell is installed is improved because the cut-and-raised bead extends between the portions corresponding to any two diagonal corners of each of the solar cells.

It is desirable that the through holes of the cut-and-raised beads provided on the reinforcing plate extend so as not to intersect with each other. As described above, when each cut-and-raised bead portion that is hollowed out, two or more cut-and-raised beads, that is, the linear through holes intersect with each other, the rigidity of the intersecting portion is reduced. Therefore, desirably, the cut-and-raised bead portions are provided so as not to intersect with each other such that the portion between both ends of each cut-and-raised bead does not cross another bead. For example, when there is another bead in the extending direction of one bead, that is, the linear through hole, the end of the one bead is desirably provided before reaching another bead.

In the configuration of the present disclosure described above, the cut-and-raised beads may be provided so as to extend adjacently along a longitudinal direction or a lateral direction in the surface of the reinforcing plate. As a result, the flexural rigidity is enhanced over the widest possible range of the reinforcing plate.

As can be understood from the above description, the issue of the present disclosure is achieved by backing the solar power generation panel with the reinforcing plate including the curved cut-and-raised beads as described above. Accordingly, another aspect of the present disclosure provides a reinforcing plate laminated and fixed to a solar power generation panel. The reinforcing plate includes a plurality of cut-and-raised beads extending along a surface of the reinforcing plate; and an extending direction of the cut-and-raised bead is curved. Such a reinforcing plate may also have various characteristic configurations in the reinforcing plate used in the above-described solar power generation panel structure.

Thus, according to the present disclosure, the impact resistance or the load resistance of the solar power generation panel is improved by reinforcing the solar power generation panel with the reinforcing plate including the cut-and-raised beads. Here, in order to increase the flexural rigidity that reduces the deflection of the reinforcing plate against the vertical load, a method is used in which the cut-and-raised bead that is a linear punched hole or a through hole is formed to reduce the Poisson's ratio of the reinforcing plate. Therefore, the weight of the reinforcing plate is reduced as much as possible, and the flexural rigidity is increased, thereby improving the impact resistance or the load resistance of the solar power generation panel structure while suppressing the increase in the weight as much as possible while. According to the configuration of the present disclosure, it is expected that the solar power generation panel can be installed on the roofs of more types of the buildings by suppressing the increase in the weight of the solar power generation panel structure.

Other objects and advantages of the present disclosure will become apparent from the following description of preferred embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1A is a schematic perspective view showing a state of installing a solar power generation panel structure in which a reinforcing plate is backed on a solar power generation panel according to the present embodiment to be installed on the roof of a building or the like;

DETAILED DESCRIPTION OF EMBODIMENTS

Figure 1A:
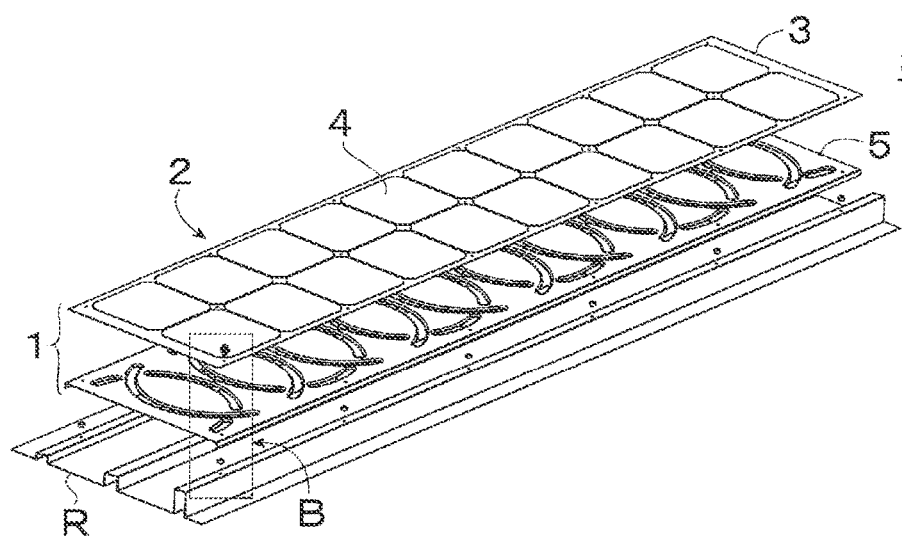

The disclosure will now be described in detail with respect to some preferred embodiments with reference to the accompanying drawings. In the drawings, the same reference numerals denote the same parts.

Configuration of Solar Power Generation Panel Structure

Figure 1B:
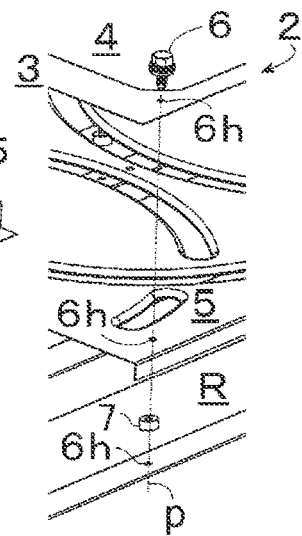
FIG. 1B is an enlarged view of the frame labeled "B" in FIG. 1A.

As schematically depicted in FIGS. 1A and 1B, a solar power generation panel structure 1 according to this embodiment is typically installed on a roof surface R of a building or the like. The solar power generation panel structure 1 includes a solar power generation panel 2 in which a plurality of generally square solar cells 4 are arranged in parallel along the vertical or horizontal direction on a plate-like panel member 3, and a reinforcing plate 5 backed by it. Here, the reinforcing plate 5 may be adhered to the solar power generation panel 2 with an adhesive, or may be fixed using set screws 6 arranged at suitable intervals as shown. In that case, screws 6 pass through screw holes 6h drilled (along line p) in each of solar power generation panel 2 and reinforcing plate 5, preferably made of any elastic material. The solar power generation panel 2 and the reinforcing plate 5 may be fixed on the roof surface R via a good bush 7. The panel member 3 and the reinforcing plate 5 may be formed from a normal metal plate material or hard resin plate material used in this field.

Structure of Reinforcing Plate

Figure 2A:
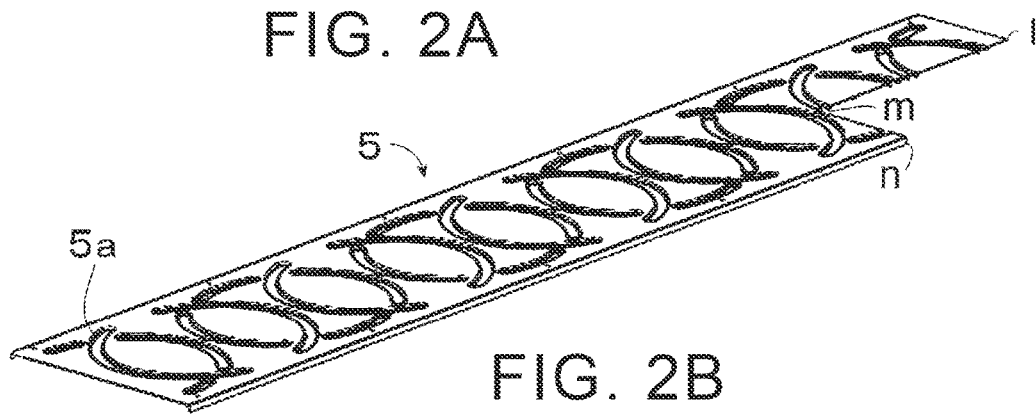
FIG. 2A is a schematic perspective view of a reinforcing plate in the solar power generation panel structure according to the present embodiment, and is drawn broken at line l-m-n.
Figure 2B:
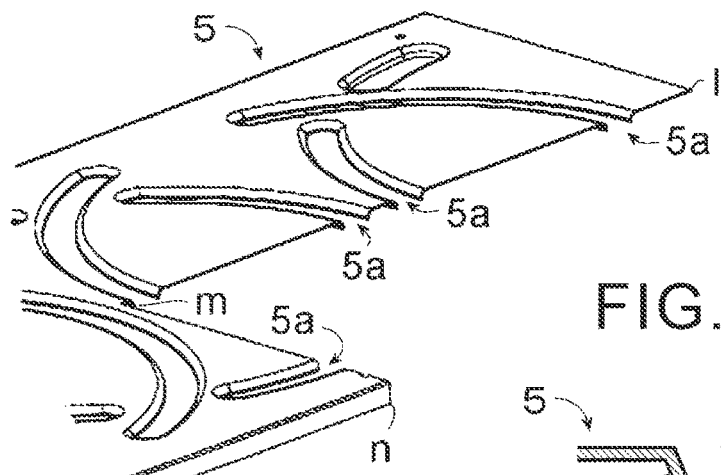
FIG. 2B is an enlarged perspective view near line l-m-n in FIG. 2A.
Figure 2C:
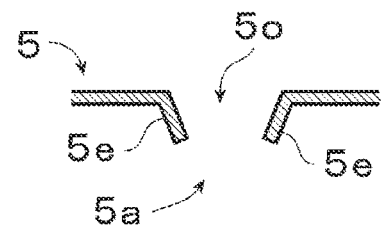
FIG. 2C is a schematic cross-sectional view of a cut-and-raised bead.

The reinforcing plate 5 is laminated on the back surface of the solar power generation panel 2 in order to improve the resistance of the solar power generation panel 2 to point-like impact loads caused by hail and distributed loads caused by wind and snow. In particular, the reinforcing plate 5 according to the present embodiment is formed with a plurality of curved cut-and-raised beads 5a, as better illustrated in FIGS. 2A and 2B. More specifically, the cut-and-raised bead 5a is a linear through-hole 50 formed in the reinforcing plate 5, as understood from FIGS. 2B and 2C. It is a bead having a shape protruding to one side of the reinforcing plate 5

(generally, the side opposite to the solar power generation panel 2) by the bending process of the edge 5e of each hole. The width of the through hole 5o and the protrusion height of the edge 5e may be determined by adaptation. Such a cut-and-raised bead 5a may typically be formed on the reinforcing plate 5 so as to evenly cover substantially the entire area thereof, as shown in FIG. 3A (in the figure, In order to show the positional relationship between the cut-and-raised bead 5a and the solar cells 4 on the solar power generation panel 2, the outline of each solar cell 4 is drawn with a dotted line.).

When the cut-and-raised bead 5a (hereinafter simply referred to as "bead") as described above is formed, first, in that region, the rigidity against bending in the direction perpendicular to the extending direction of the bead 5a is increased. It will be improved. Further, since the bead 5a has a structure of a punched hole or a through hole, when a load including a component in the direction normal to the surface of the reinforcing plate 5 is applied, the area where the bead 5a extends does not cause the reinforcing plate 5 is absorbed in the through hole portion, the Poisson's ratio of the structure 1 is reduced, and the flexural rigidity is further increased as shown by the above formulas (2a) and (2b). It will happen. Then, in the region where the bead 5a extends, the rate of absorbing the energy of the load component in the direction normal to the surface of the reinforcing plate 5 as stored elastic energy increases corresponding to the increase in the bending rigidity. Since the flexure of the surface (displacement in the direction perpendicular to the surface) is reduced, the area is less likely to break, thus improving impact resistance or load resistance.

Figure 4A:
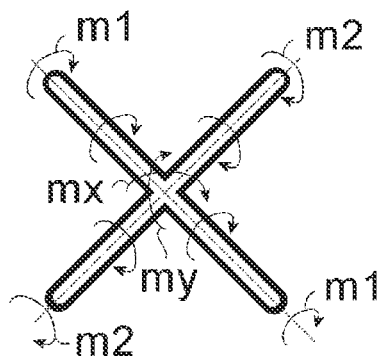
FIG. 4A is a schematic plan view of a part of the reinforcing plate for explaining the direction of twist that tends to occur in the cut-and-raised bead formed in the reinforcing plate.
Figure 4B:
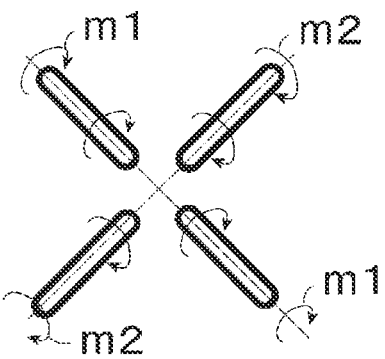
FIG. 4B is a schematic plan view of a part of the reinforcing plate for explaining the direction of twist that tends to occur in the cut-and-raised bead formed in the reinforcing plate.
Figure 4C:
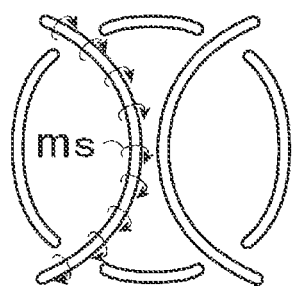
FIG. 4C is a schematic plan view of a portion of the reinforcing plate for explaining the direction of twist that tends to occur in the cut-and-raised bead formed in the reinforcing plate when the bead is curved and formed.

Furthermore, in the case of this embodiment, the bead 5a is formed so as to extend curvedly, and according to this configuration, it is possible to avoid being vulnerable to twisting in a specific direction. More specifically, in the case of this embodiment, the bead 5a portion is hollowed out, so that it is vulnerable to twisting around the extending direction of the bead 5a. Therefore, if the bead 5a is formed in a straight line as shown in FIGS. 4A and 4B, the reinforcing plate becomes vulnerable to torsions m1 and m2 around a specific direction over a wide range. This can make the entire reinforcing plate vulnerable to twisting in that particular direction. On the other hand, in the present embodiment, the bead 5a is formed so that its extending direction is curved, that is, the tangent to the extending direction of the bead 5a changes gradually. As shown in FIG. 4C, the direction ms in which there is vulnerability to torsion gradually changes, and the directions in which there is vulnerability to torsion are dispersed throughout the reinforcing plate, and no direction vulnerable to torsion is formed.

Figure 3A:
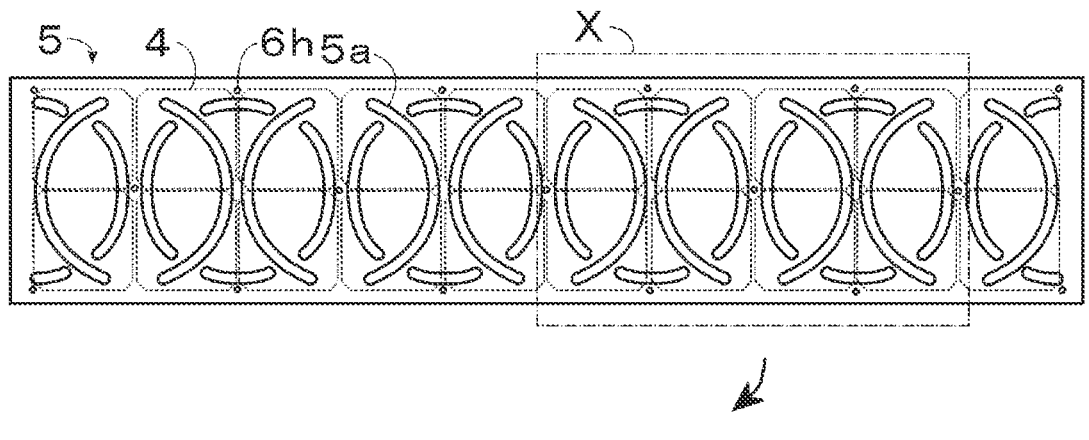
FIG. 3A is a schematic plan view of a reinforcing plate in the solar power generation panel structure according to this embodiment.

Furthermore, as understood from FIG. 3A, the beads 5a of this embodiment are preferably formed so as not to cross each other. That is, preferably, the plurality of beads 5a is arranged in the reinforcing plate 5 so as not to form a cross-shaped through hole. If the through-holes intersect as shown in FIG. 4A, the rigidity against bending or twisting mx, my decreases in any direction at the intersecting portion. Therefore, preferably, in this embodiment, the arrangement of the plurality of beads 5a is adjusted so that such a fragile portion is not formed in the reinforcing plate 5. Specifically, it is preferable that both ends of any bead are formed so as not to straddle other beads.

Placement of Cut-and-Raised Beads

Figure 3B:
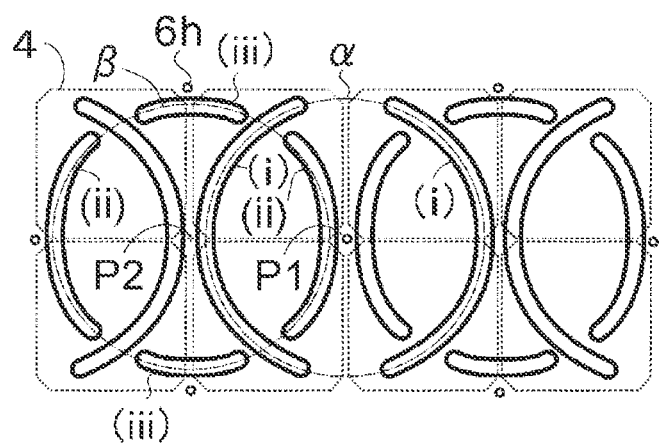
FIG. 3B is an enlarged plan view of the reinforcing plate within the frame labeled "X" in FIG. 3A.

As already mentioned, in this embodiment, a plurality of cut-and-raised beads 5a may be formed so as to cover substantially the entire area of the reinforcing plate 5. In one embodiment, as depicted in FIGS. 3A and 3B, a plurality of beads 5a may be arranged along a substantially circular or elliptical shape on the reinforcing plate 5, thereby rigidity is evenly distributed in the area where the bead 5a is arranged. In particular, in the present embodiment, the purpose is to protect each of the solar cells. The beads 5a may be arranged so as to generally connect the portions in contact with the two corners located diagonally in each of the solar cells such that the present area of the beads 5a covers each of the solar cells. That is, the arc-shaped beads 5a are provided so as to substantially overlap each of the diagonal corners of the respective solar cells, so that the beads 5a can be arranged so as to cover the respective solar cells.

As an example, in the case of FIGS. 3A and 3B, when the solar cells are arranged side by side in 2 rows and 10 columns on the panel member 3, a set of 2 rows and 2 columns of solar cells is used as four such solar cells. The beads 5a may be arranged along a circle (inscribed circle) generally inscribed in the outer circumference of the solar cell, and furthermore, the inscribed circles in which the beads 5a are arranged may be shifted one cell at a time in the column direction and overlapped. Specifically, as depicted in FIG. 3B, the bead (i) is arranged along a circle α centered at P1 and inscribed in the outer periphery of the occupied area of the central four solar cells, The beads (ii) and (iii) are arranged along a circle β centered on P2 and inscribed in the outer circumference of the area occupied by the four solar cells on the left side, and this arrangement extends over the entire area of the reinforcing plate 5. With this configuration, the curved beads 5a extend between the diagonal corners of each solar cell. According to such a bead arrangement, in each solar cell, the surface rigidity between two pairs of diagonal corners is increased, and impact resistance or load resistance is improved.

Figure 5A:
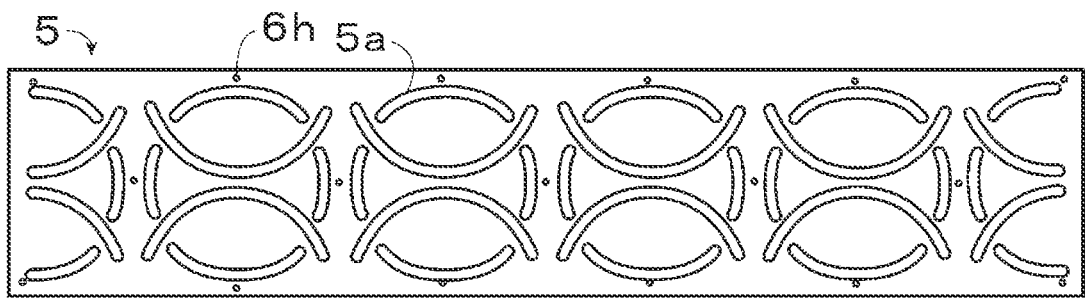
FIG. 5A is a schematic plan view of another aspect of the reinforcing plate in the solar power generation panel structure according to this embodiment.
Figure 5B:
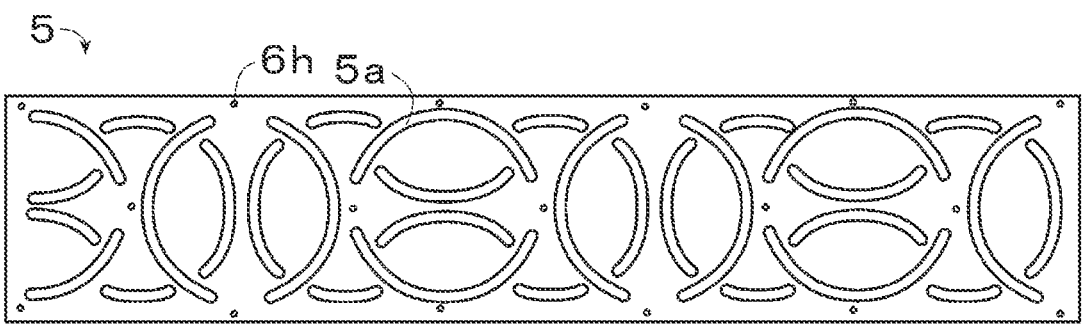
FIG. 5B is a schematic plan view of another aspect of the reinforcing plate in the solar power generation panel structure according to this embodiment.
Figure 5C:
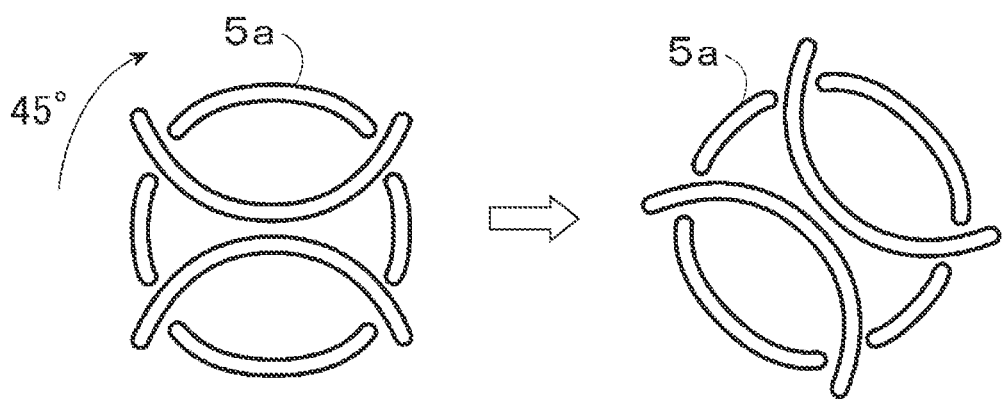
FIG. 5C is a diagram explaining that the extending direction of the cut-and-raised bead on the reinforcing plate can be changed.

The arrangement of the beads 5a on the reinforcing plate 5 is not limited to the pattern illustrated in FIG. 3A, and any pattern may be available as long as the curved bead 5a is disposed adjacently over the entire area of the reinforcing plate 5. For example, as exemplified in FIGS. 5A and 5B, the pattern of FIG. 3A may be changed (in either case, beads 5a are extended to corresponding portions between the diagonal corners of each solar cell. The beads 5a are arranged so that they are present). Alternatively, as shown in FIG. 5C, a pattern obtained by rotating the pattern in FIG. 5A by 45 degrees may be employed.

In the solar power generation panel 2, the solar cells may be arranged in any row and any column and still fall within the scope of the present disclosure. In addition, the extending shape of the bead is not limited to a circular arc or an elliptical arc, but may be a parabola, a hyperbola, or any other curved shape in which the tangent line gradually changes (however, in the case of a circle or an ellipse, the bead Advantageously, the stiffness of the area in which it is located is evenly distributed in all directions.).

Calculation Experiment Example

In a solar power generation panel backed by a reinforcing plate having a cut-and-raised bead formed according to this embodiment, the displacement distribution of the surface when point-like displacement was applied was calculated, and the effect of this embodiment was evaluated.

In calculating the displacement distribution, the solar power generation panel 2 is composed of Galvalume steel plate (registered trademark): thickness 0.4 mm, ionomer: thickness 0.8 mm, silicon single crystal cell (solar cell):

thickness 0.18 mm, ionomer : 0.4 mm thick and ETFE film: 0.05 mm thick were laminated in order and heat-fixed. The reinforcing plate was a galvalume steel plate (registered trademark): a cut-and-raised bead having a width of 20 mm and a thickness of 0.27 mm was cut and raised as shown in FIG. 3A. The length of one side of the solar cell was 158 mm, the radius of the circle drawn by beads (i) and (ii) was 143 mm, and the radius of the circle drawn by bead (iii) was 135 mm. The solar power generation panel 2 and the reinforcing plate 5 were fixed at the screw holes 6$h$ with M5 tap screws. Then, the reaction force when forced downward displacement of 3 mm was applied to the midpoint of the diagonal line of one solar cell was calculated by the finite element method.

Figure 6A:
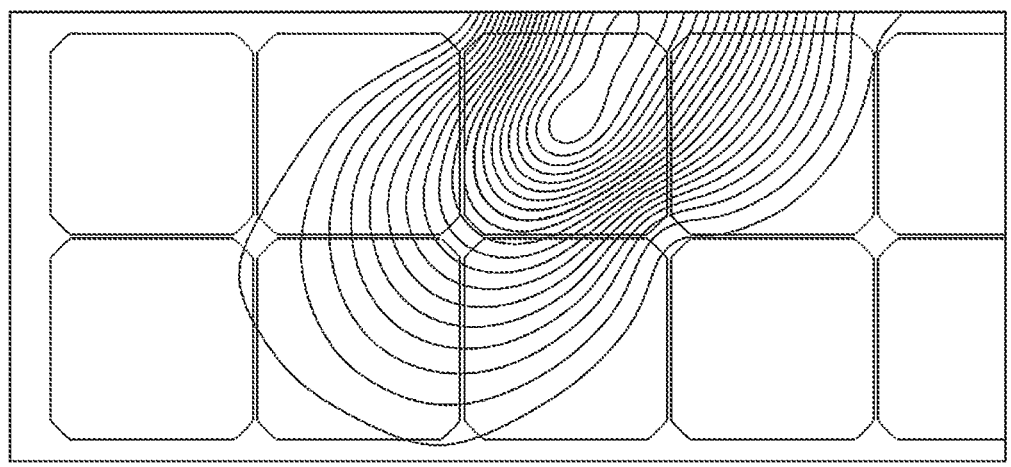
FIG. 6A is a plan view of a solar power generation panel showing contour lines of the distribution of bending deformation when forced point-like displacement is applied to the panel by simulation, and is the case of the solar power generation panel structure with the same thickness as the case where the reinforcing plate is applied without a bead is applied.
Figure 6B:
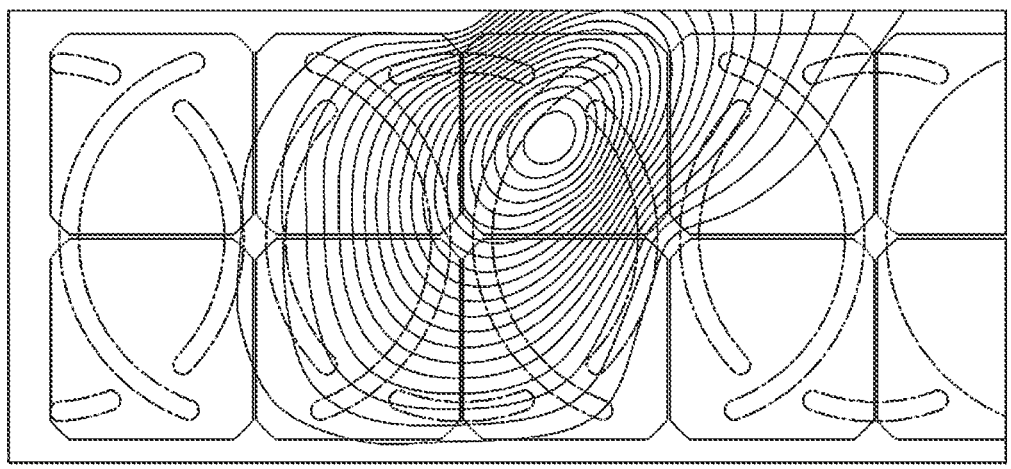
FIG. 6B is a plan view of the solar power generation panel showing the contour lines of the distribution of bending deformation when forced point displacement is applied to the solar power generation panel by simulation, and the case for a solar power generation panel structure that has been constructed with the reinforcing plate according to the present embodiment is applied.

FIGS. 6A and 6B are diagrams showing contour lines of the distribution of displacement of the solar power generation panel when the forced displacement described above is applied. The contour pitch is 1/20 of the applied forced displacement. FIG. 6A is the result when a panel member with a thickness of 0.67 mm is used (equivalent to the case where a reinforcing plate without beads is applied to a solar power generation panel), and FIG. 6B is the result when the reinforcing plate having the above is applied to the solar power generation panel. Comparing these figures, it can be seen that with the bead according to this embodiment of FIG. 6B, the displacement is distributed over a wider range than without the bead of FIG. 6A. As a result, in the case of having the beads according to the present embodiment, compared with the case without the beads, the deflection due to the locally acting point load is shallower and more widely distributed, and the locally large deflection does not occur, indicating that the structure is less likely to be destroyed. In addition, the stored elastic energy when the above displacement was applied was $1.3 \times 10^{-1}$ J when there was no bead in FIG. 6A, whereas when there was a bead in FIG. 6B, it was $1.9 \times 10^{-1}$ J, a 46% increase in stored elastic energy. This means that the use of the reinforcing plate according to the teachings of the present embodiment absorbs more load energy as stored elastic energy, reduces the displacement of the structure, makes it less likely to break, and increases impact resistance or resistance. It shows that the load capacity is improved.

Thus, according to the structure using the reinforcing plate according to the above-described present embodiment, the increase in the surface rigidity of the reinforcing plate for improving the impact resistance or load resistance of the structure contributes to the formation of cut-and-raised beads on the reinforcing plate. In such a structure, since the thickness of the reinforcing plate is not increased in order to increase the surface rigidity of the structure, it is possible to improve the impact resistance or load resistance of the structure while suppressing the increase in weight as much as possible. It is advantageous in terms of Further, according to this embodiment, it is expected that there will be more opportunities to install solar power generation panels even on the roofs of buildings, etc., where there is a weight limit for installation items.

Although the above description has been given with reference to the embodiments of the present disclosure, many modifications and changes will readily occur to those skilled in the art, and the present disclosure is limited only to the above-exemplified embodiments. It will be clear that the disclosure is non-limiting and can be applied to a variety of devices without departing from the concept of the disclosure.

What is claimed is:

1. A solar power generation panel structure comprising:
   a solar power generation panel in which a plurality of square solar cells is arranged in two rows in a longitudinal direction of a panel member; and
   a reinforcing plate laminated and fixed to the solar power generation panel, the reinforcing plate including a plurality of rising beads, wherein:
   the plurality of rising beads is in a curved shape, extending along a surface of the reinforcing plate,
   each of the plurality of rising beads is a protrusion protruding to a side opposite to the solar power generation panel, and
   the protrusion has a perpendicular extension from the surface of the reinforcing plate.

2. The solar power generation panel structure according to claim 1, wherein the plurality of rising beads is arranged along a circle or an ellipse.

3. The solar power generation panel structure according to claim 1, wherein the plurality of rising beads extends so as not to intersect with each other.

4. The solar power generation panel structure according to claim 1, wherein the plurality of rising beads extends adjacently along a longitudinal direction or a lateral direction in the surface of the reinforcing plate.

5. The solar power generation panel structure according to claim 1, wherein the reinforcing plate is laminated to a surface of the solar power generation panel opposite to a surface on which the solar cells are attached.

6. The solar power generation panel structure according to claim 1, wherein the reinforcing plate and the solar power generation panel each has a plurality of screw holes, and
   the reinforcing plate is fixed to the solar power generation panel with a screw through at least one of the plurality of screw holes.

7. The solar power generation panel structure according to claim 1, wherein the protrusion is a flanged aperture formed in the reinforcing plate.

8. The solar power generation panel structure according to claim 1, wherein the plurality of rising beads is arranged in a repeating unit along a longitudinal direction of the reinforcing plate.

9. The solar power generation panel structure according to claim 8, wherein:
   the plurality of rising beads includes a first pair of the plurality of rising beads and a second pair of the plurality of rising beads,
   the first pair is an elongated pair, longer than the second pair,
   the first pair is present symmetrically with respect to a central, longitudinal axis of the reinforcing plate, and
   the second pair is present symmetrically with respect to an axis intersecting a space between the first pair.

10. The solar power generation panel structure according to claim 1, wherein:
    the reinforcing plate is laminated to a surface of the solar power generation panel opposite to a surface on which the solar cells are attached, and
    the plurality of rising beads is arranged in a repeating unit along a longitudinal direction of the reinforcing plate.

11. The solar power generation panel structure according to claim 1, wherein:
    the reinforcing plate and the solar power generation panel each has a plurality of screw holes,
    the reinforcing plate is fixed to the solar power generation panel with a screw through at least one of the plurality of screw holes, and the plurality of rising beads is arranged in a repeating unit along a longitudinal direction of the reinforcing plate.

12. The solar power generation panel structure according to claim 1, wherein:
the reinforcing plate is laminated to a surface of the solar power generation panel opposite to a surface on which the solar cells are attached,
the plurality of rising beads is arranged in a repeating unit along a longitudinal direction of the reinforcing plate,
the plurality of rising beads includes a first pair of the plurality of rising beads and a second pair of the plurality of rising beads,
the first pair is an elongated pair, longer than the second pair,
the first pair is present symmetrically with respect to a central, longitudinal axis of the reinforcing plate, and
the second pair is present symmetrically with respect to an axis intersecting a space between the first pair.

13. The solar power generation panel structure according to claim 1, wherein:
the reinforcing plate and the solar power generation panel each has a plurality of screw holes,
the reinforcing plate is fixed to the solar power generation panel with a screw through at least one of the plurality of screw holes,
the plurality of rising beads is arranged in a repeating unit along a longitudinal direction of the reinforcing plate,
the plurality of rising beads includes a first pair of the plurality of rising beads and a second pair of the plurality of rising beads,
the first pair is an elongated pair, longer than the second pair,
the first pair is present symmetrically with respect to a central, longitudinal axis of the reinforcing plate, and
the second pair is present symmetrically with respect to an axis intersecting a space between the first pair.

14. A reinforcing plate for a solar power generation panel structure comprising a plurality of rising beads, wherein:
the plurality of rising beads is in a curved shape, extending along a surface of the reinforcing plate,
each of the plurality of rising beads is a protrusion protruding to a side opposite to the solar power generation panel, and
the protrusion has a perpendicular extension from the surface of the reinforcing plate.

* * * * *